(12) United States Patent
Durik et al.

(10) Patent No.: US 12,703,037 B2
(45) Date of Patent: Aug. 11, 2026

(54) SYSTEMS AND METHODS TO PROVIDE INTERFACES FOR CONTROL OF WELDING-TYPE SYSTEMS

(71) Applicant: Illinois Tool Works Inc., Glenview, IL (US)

(72) Inventors: Justin Durik, Greenville, WI (US); Steven Blair Massey, Jr., Appleton, WI (US); Craig Steven Knoener, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1020 days.

(21) Appl. No.: 17/872,618

(22) Filed: Jul. 25, 2022

(65) Prior Publication Data

US 2023/0060789 A1 Mar. 2, 2023

Related U.S. Application Data

(60) Provisional application No. 63/239,009, filed on Aug. 31, 2021.

(51) Int. Cl.
*B23K 9/09* (2006.01)
*B23K 9/095* (2006.01)
(Continued)

(52) U.S. Cl.
CPC ............ *B23K 9/091* (2013.01); *B23K 9/0953* (2013.01); *B23K 9/1062* (2013.01); *B23K 9/1087* (2013.01); *B23K 9/32* (2013.01)

(58) Field of Classification Search
CPC ........ B23K 9/32; B23K 9/091; B23K 9/0953; B23K 9/1062; B23K 9/1087
See application file for complete search history.

(56) References Cited

U.S. PATENT DOCUMENTS 6,096,994 A * 8/2000 Handa .................. B23K 9/1062 901/42
8,592,772 B2 * 11/2013 Stein ...................... A61B 6/025 250/363.04

(Continued)

FOREIGN PATENT DOCUMENTS

EP 0865858 9/1998
WO 9710919 3/1997

OTHER PUBLICATIONS

Canadian Office Action Appln. No. 3,170,291 dated Sep. 19, 2023.

(Continued)

*Primary Examiner* — Brian W Jennison
(74) *Attorney, Agent, or Firm* — McAndrews Held & Malloy, Ltd.

(57) ABSTRACT

An example welding-type power supply includes: power conversion circuitry configured to convert input power to welding-type power; a user interface configured to receive two or more inputs associated with corresponding qualitative characteristics of a welding arc created by the welding-type power, wherein the two or more inputs are defined within corresponding ranges of the respective qualitative characteristics; and control circuitry configured to: in response to a change in a first one of the two or more inputs, determine a corresponding change in a second one of the two or more inputs based on a relationship between the first and second ones of the two or more inputs; determine two or more welding-type parameters based on the two or more inputs; and control the power conversion circuitry based on the determined welding-type parameters.

20 Claims, 8 Drawing Sheets

(51) Int. Cl.
*B23K 9/10* (2006.01)
*B23K 9/32* (2006.01)

(56) References Cited

U.S. PATENT DOCUMENTS

| | | | | |
|---|---|---|---|---|
| 2012/0234813 | A1* | 9/2012 | Ryan | B23K 9/095<br>219/137 R |
| 2015/0273609 | A1* | 10/2015 | Denis | B23K 9/1043<br>219/132 |
| 2017/0036288 | A1* | 2/2017 | Albrecht | B23K 31/125 |
| 2020/0246901 | A1* | 8/2020 | Lytle | B23K 9/09 |
| 2021/0101220 | A1 | 4/2021 | Dunahoo | |

OTHER PUBLICATIONS

Canadian Office Action Appln. No. 3,170,291 dated Jun. 11, 2024.
European Office Communication Appln No. 22190486.5 dated Mar. 6, 2025.
European Office Communication with extended Search Report Appln No. 22190486.5 dated Feb. 2, 2023.

* cited by examiner

SYSTEMS AND METHODS TO PROVIDE INTERFACES FOR CONTROL OF WELDING-TYPE SYSTEMS

FIELD OF THE DISCLOSURE

This disclosure relates generally to welding-type systems using repeated waveforms and, more particularly, to systems and methods to provide interfaces for control of welding-type systems.

BACKGROUND

Conventional welding power supplies provide controls for individual welding parameters, such as welding voltage, wire feed speed, inductance, and/or current. Some conventional welding power supplies include controls such as arc control, which changes welding power by increasing or decreasing the wire feed speed command, which in turn changes the pulse data such as peak voltage, peak current, background voltage, background current, pulse width, frequency, and ramp rates. However, conventional welding power supplies using arc control may, in certain situations or parameter configurations, change variables in contravention of operator expectations.

SUMMARY

Systems and methods to control systems and methods to provide interfaces for control of welding-type systems are disclosed, substantially as illustrated by and described in connection with at least one of the figures, as set forth more completely in the claims.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
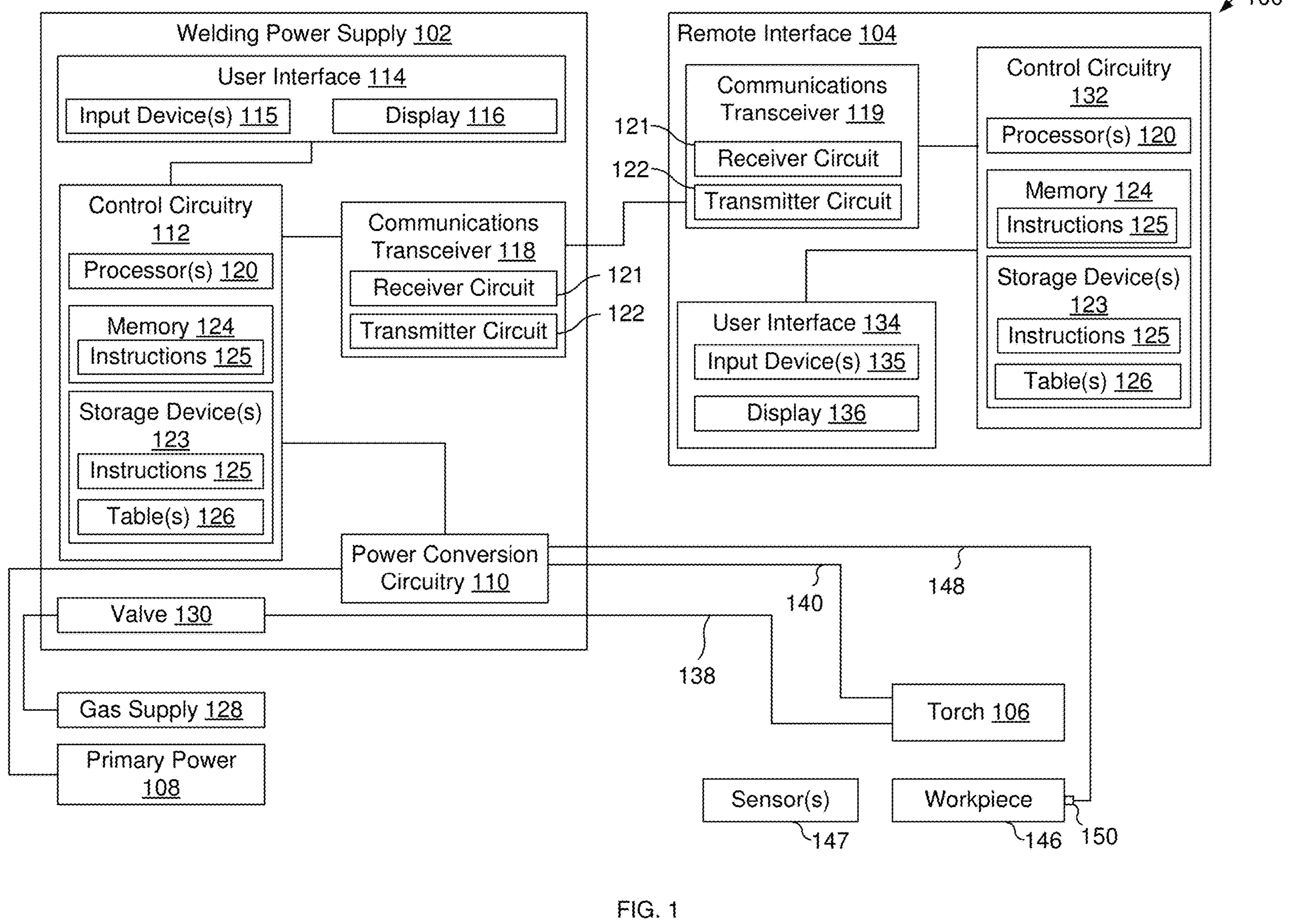
FIG. 1 is a schematic diagram of an example welding system including a welding-type power supply configured to output welding-type power, in accordance with aspects of this disclosure.

Disclosed example systems and methods provide the user an interface with which the user can change qualitative arc characteristics that are well understood by typical or untrained users. In some disclosed examples, the interface provides the user with inputs corresponding to different qualitative arc characteristics that can be manipulated (e.g., via a sliding input over a range). Examples of such qualitative arc characteristics include a hot arc/cold arc range, a narrow arc/wide arc range, a soft arc/stiff arc range, and a long arc/short arc range. The interface allows the user to move each slide based on the arc characteristic the user wants to change. In response to changes to the slider inputs, the interface may change the underlying welding parameters or pulse data that correlates to the arc characteristic(s) changed by the user. Disclosed example systems and methods also calculate changes to other ones of the characteristics that may be needed to keep the underlying welding parameters within an optimal range, a preferred range, or a workable range of values for the welding parameters. When changing the inputs or underlying parameters, example systems and methods may be configured to keep the arc length, heat input, or other parameter constant.

As used herein, "descriptive characteristics" or "qualitative characteristics" are distinguished from quantitative parameters such as voltage, current, wire feed speed, inductance, or power. Example "descriptive characteristics" or "qualitative characteristics" include a descriptive heat input (e.g., hot vs. cold), arc length (long vs. short), arc width (wide vs. narrow), and/or arc stiffness (e.g., soft arc vs. stiff arc).

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include power limiting circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first time occurs prior to a second time within a time period, the terms "first time" and "second time" do not imply any specific order in which the first or second times occur relative to the other within the time period.

The term "welding-type system," as used herein, includes any device capable of supplying power suitable for welding, plasma cutting, induction heating, Carbon Arc Cutting-Air (e.g., CAC-A) and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

Disclosed example welding-type power supplies include: power conversion circuitry configured to convert input power to welding-type power; a user interface configured to receive two or more inputs associated with corresponding qualitative characteristics of a welding arc created by the welding-type power, wherein the two or more inputs are defined within corresponding ranges of the respective qualitative characteristics; and control circuitry configured to: in response to a change in a first one of the two or more inputs, determine a corresponding change in a second one of the two or more inputs based on a relationship between the first and second ones of the two or more inputs; determine two or more welding-type parameters based on the two or more inputs; and control the power conversion circuitry based on the determined welding-type parameters.

In some example power supplies, the control circuitry is configured to update the user interface to represent the changes to the second one of the one or more inputs based on the change made to the first one of the one or more inputs. In some example power supplies, the user interface further includes a locking input for the second one of the two or more inputs, in which the control circuitry is configured to not implement the change in the second one of the two or more inputs when the locking input is enabled.

In some example power supplies, the user interface further includes an arc length locking input, wherein the control circuitry is configured to determine changes in the second one of the two or more inputs in response to a change in the first one of the two or more inputs based on maintaining an arc length when the arc length locking input is enabled. In some example power supplies, the control circuitry is configured to determine the changes in the second one of the two or more inputs based on maintaining a heat input while the arc length locking input is enabled, wherein the heat input is based on a configuration of the two or more inputs when the arc length locking input is enabled. In some example power supplies, the control circuitry is configured to display a value of the arc length via the user interface.

In some example power supplies, the two or more welding-type parameters include two or more pulse parameters. In some example power supplies, the control circuitry is configured to determine the change in the second one of the two or more inputs based on a lookup table representative of at least one of the relationship or sets of parameter values for the qualitative characteristics.

In some example power supplies, the two or more inputs include two or more arc pulsing qualities. In some example power supplies, the two or more arc pulsing qualities include two or more of: a pulse peak, a pulse background, a pulse width, a pulse frequency, or a pulse ramp rate.

In some example power supplies, the user interface includes a touchscreen configured to show the two or more inputs. In some example power supplies, the two or more inputs each include an interactive slider input, in which the touchscreen is configured to enable manipulation of each slider input within a corresponding range of the slider input. In some example power supplies, the two or more inputs include two or more of: an arc heat input; an arc penetration; an arc length; an arc width; or an arc stiffness. In some example power supplies, the user interface includes three or more inputs associated with corresponding qualitative characteristics of the welding arc, the control circuitry configured to, in response to the change in the first one of the three or more inputs, determine a corresponding change in the second one of the three or more inputs based on the first one of the three or more inputs and a third one of the three or more inputs.

In some example power supplies, the user interface includes three or more inputs associated with corresponding qualitative characteristics of the welding arc, the control circuitry configured to, in response to the change in the first one of the three or more inputs, determine corresponding changes in the second one of the three or more inputs and in a third one of the three or more inputs, based on the change in the first one of the three or more inputs.

Some other disclosed example welding-type power supplies include: power conversion circuitry configured to convert input power to welding-type power; a user interface configured to receive two or more inputs associated with corresponding qualitative characteristics of a welding bead created by the welding-type power, wherein the two or more inputs are defined within corresponding ranges of the respective qualitative characteristics; and control circuitry configured to: in response to a change in a first one of the two or more inputs, determine a corresponding change in a second one of the two or more inputs based on a relationship between the first and second ones of the two or more inputs; determine two or more welding-type parameters based on the two or more inputs; and control the power conversion circuitry based on the determined welding-type parameters.

In some examples, the user interface further includes an input associated with a qualitative characteristics of a welding arc. In some examples, the user interface further includes an input associated with a qualitative characteristics of robotic welding. In some examples, the qualitative characteristics of a welding bead include at least one of a weld bead width, a weld bead height, a weld bead concavity, or a penetration.

Disclosed example welding interfaces include: a user interface configured to receive two or more inputs associated with corresponding qualitative characteristics of a welding arc, a welding bead, or a combination of the welding arc and the welding bead, wherein the two or more inputs are defined within corresponding ranges of the respective qualitative characteristics; and control circuitry configured to: in response to a change in a first one of the two or more inputs, determine a corresponding change in a second one of the two or more inputs based on a relationship between the first and second ones of the two or more inputs; and determine two or more welding-type parameters based on the two or more inputs.

Turning now to the drawings, FIG. 1 is a block diagram of an example welding system 100 having a welding-type power supply 102, a remote interface 104, and a welding torch 106. The welding system 100 powers, controls, and/or supplies consumables to a welding application. In the example of FIG. 1, the power supply 102 directly supplies welding-type output power to the welding torch 106. The welding torch 106 may be configured for any welding-type process involving DC welding-type current, pulsed DC welding-type current waveforms, and/or AC waveforms. Example DC pulse waveforms that may be output by the power supply 102 have a peak phase at a peak current and a background phase at a background current, and one pulse cycle includes one peak phase and one background phase.

The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on welding parameters and outputs the welding-type power via a weld circuit.

The power supply 102 includes control circuitry 112 to control the operation of the power supply 102. The power supply 102 also includes a user interface 114. The control circuitry 112 receives input from the user interface 114, through which a user may choose a process and/or input desired parameters. As disclosed in more detail below, the example user interface 114 enables a user to select values for qualitative characteristics of a welding arc, a welding bead, and/or robotic control, which are then converted into welding parameters by the control circuitry 112 for control of the power conversion circuitry 110.

The user interface 114 may receive inputs using one or more input devices 115, such as via a keypad, keyboard, physical buttons, switches, knobs, a mouse, a keyboard, a keypad, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator.

Similarly, the example remote interface 104 may include a user interface 134 having one or more input device(s) 135 and a display 136. The user interface 134, the input device(s) 135, and/or the display 136 may be similar, identical, or different than the user interface 114, the input device(s) 115, and/or the display 116. The example remote interface 104 may be, for example, a separate welding interface, a computing device (e.g., a server, a desktop computer, a laptop computer, etc.), a tablet computer, a smartphone or other portable computing device, a robot control pendant, and/or any other type of interface device. In some examples, the remote interface 104 may permit determination of parameters as disclosed herein for communication, copying, and/or any other transfer to the power supply 102 or robotic system.

The control circuitry 112 may also include interface circuitry for communicating data to other devices in the system 100, such as the remote interface 104. For example, in some situations, the power supply 102 wirelessly communicates with the remote interface 104. Further, in some situations, the power supply 102 communicates with the remote interface 104 using a wired connection, such as by using a network interface controller (NIC) to communicate data via a network (e.g., ETHERNET, 10baseT, 10base100, etc.), and/or. In some examples, the control circuitry 112 communicates with the remote interface 104 via the weld circuit.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include predetermined relationships between frequency and amperage, such as one or more look up tables, as described in more detail below.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 138 (which in some implementations may be packaged with the welding power output) to the welding torch 106, which provides the shielding gas to the welding application. In some examples, the welding system 100 does not include the gas supply 128, the valve 130, and/or the cable 138.

In the example of FIG. 1, the power supply 102 includes a communications transceiver 118, and the remote interface 104 includes a communications transceiver 119. The communications transceivers 118, 119 each include a corresponding receiver circuit 121 and a corresponding transmitter circuit 122. The example communications transceivers 118, 119 enable the remote interface 104 to transmit commands to the power supply 102 and/or receive information from the power supply 102. Example commands may include commands to set parameters and/or otherwise configure the power supply 102. The remote interface 104 may receive information about the configuration of the power supply 102.

The remote interface 104 further includes control circuitry 132, which may include one or more processor(s) 120, one or more storage device(s) 123, and/or memory 124, and/or may store and execute machine readable instructions 125. The control circuitry 132, the processor(s) 120, the storage device(s) 123, and/or the memory 124 may be similar, identical, or different than the control circuitry 112, the processor(s) 120, the storage device(s) 123, and/or the memory 124 of the power supply 102.

The welding torch 106 delivers the welding power and/or shielding gas for a welding application. The welding torch 106 is used to establish a welding arc between the welding torch 106 and a workpiece 146. A welding cable 140 couples the torch 106 to the power conversion circuitry 110 to conduct current to the torch 106. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146.

In some examples, one or more sensors 147 are included with or connected to the welding torch 106 to monitor one or more welding parameters (e.g., power, voltage, current, inductance, impedance, etc.) to inform the control circuitry 132 and/or 112 during the welding process.

To aid a weld operator in configuring the welding-type power supply 102 appropriately (e.g., welding parameters), the example storage device(s) 123 may store tables 126 (e.g., lookup tables) or other data representative of relationships between qualitative characteristics (e.g., arc length, arc stiffness, arc width, arc heat, pulse peak, pulse background, pulse frequency, pulse ramp rate, pulse width, weld bead height, bead width, bead concavity, etc.) and welding parameters (e.g., voltage, current, power, inductance, wire feed speed, pulse program, pulse parameters, etc.). The tables 126 may map relationships between ranges of values of the qualitative characteristics and ranges of values for the welding parameters, for both individual qualitative characteristics and/or combinations of qualitative characteristics. The tables 126 further store relationships between different qualitative characteristics to enable a determination of appropriate changes in one or more qualitative characteristics in response to a change in other characteristics via the user interface 114, 134. In some examples, the tables 126 may store further relationships and/or data relating qualitative characteristics and/or welding parameters to robotic control parameters, such as travel speed, work angle, and/or travel angle. The example tables 126 may be populated based on empirical testing using different combinations of welding parameters.

Using the tables 126 and/or other stored relationship(s), the example control circuitry 112 responds to changes in qualitative characteristics via the user interface 114 by determining a corresponding change in one or more other ones of the qualitative characteristic inputs. The control circuitry 112 may further use the tables 126 and/or other stored relationship(s) to determine welding-type parameters based on the qualitative characteristics. The operator may adjust the qualitative characteristics via the user interface 114, 134 until the operator identifies a desired combination of arc, bead, and/or pulse characteristics, from which the control circuitry 112 determines the corresponding welding-type parameters without further calculation or intervention by the operator. When the operator performs welding, the control circuitry 112 controls the power conversion circuitry 110 based on the determined welding-type parameters.

Figure 2A:
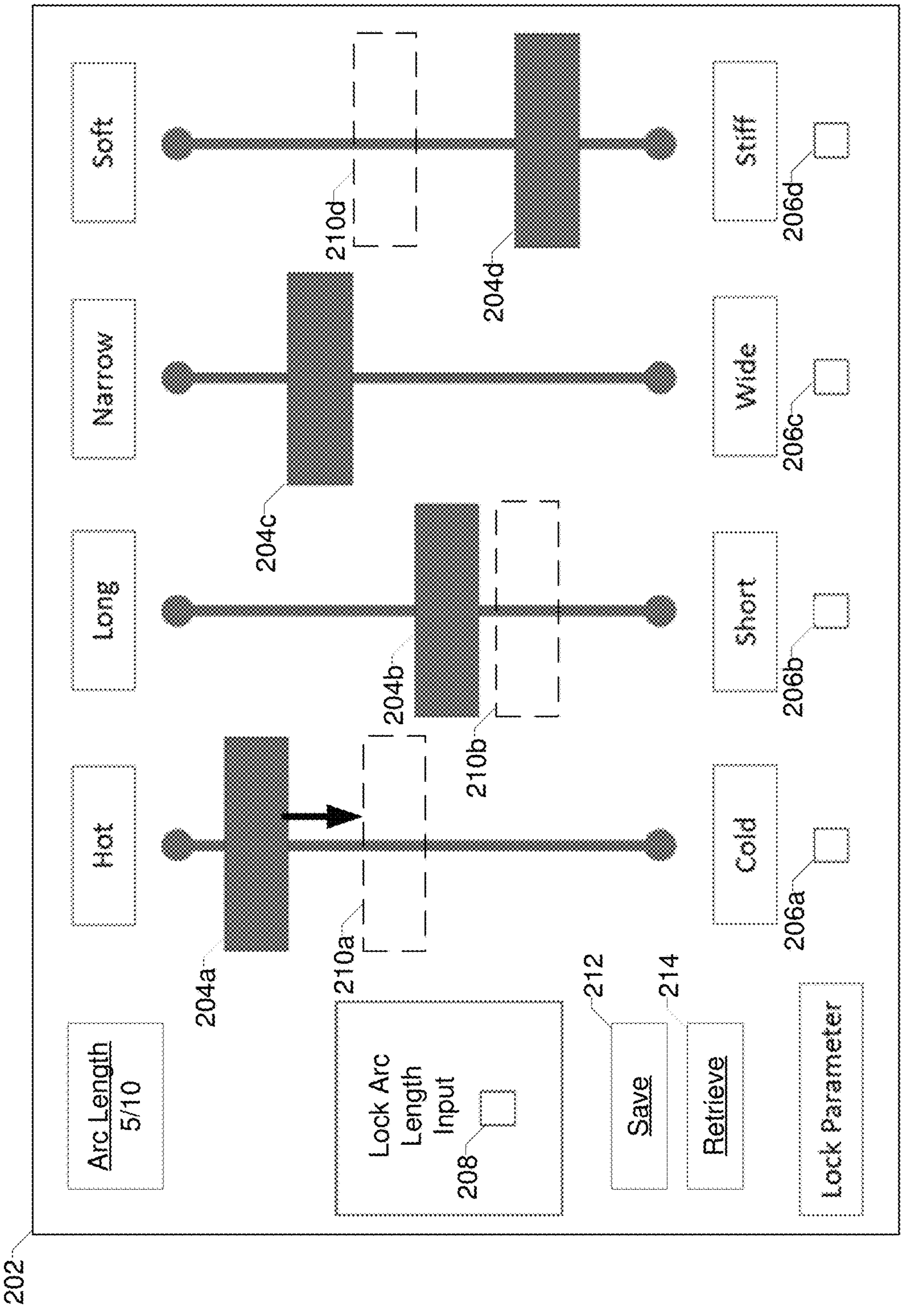
FIG. 2A illustrates an example user interface that may be used to implement the user interface of FIG. 1 to provide an interface for control of the welding-type power supply based on inputting qualitative characteristics of a welding arc.

FIG. 2A illustrates an example user interface 200 that may be used to implement the user interface 114, 134 of FIG. 1 to provide an interface for control of the welding-type power supply 102 based on inputting qualitative characteristics of a welding arc. The example user interface 200 of FIG. 2A includes a display 202, qualitative characteristic inputs **204*a*-204*d*, parameter locking selectors 206*a*-206*d*, and an arc length input lock selector 208. The two or more inputs 204*a*-204*d* each include an interactive slider input, in which a touchscreen (e.g., the display 202) is configured to enable manipulation of each slider input within a corresponding range of the slider input. The example inputs 204*a*-204*d*, parameter locking selectors 206*a*-206*d*, and an arc length input lock selector 208 may implement the input devices 115, 135 of FIG. 1**.

The example inputs **204*a*-204*d* correspond to individual qualitative, or descriptive, characteristics of a welding arc created by the welding-type power output by the welding-type power supply 102. The qualitative characteristics in the example interface 200 include arc heat 204*a* (e.g., hotter, colder), arc length 204*b* (e.g., longer, shorter), arc width 204*c* (e.g., narrower, wider), arc stiffness 204*d* (e.g., softer, stiffer), and/or arc penetration (e.g., deeper, shallower). In the example interface 200**, the qualitative characteristics do not include welding parameters such as voltage, current, wire feed speed, inductance, or power (wattage).

While the example inputs **204*a*-204*d* on the interface 200 are virtual slider bars implemented on the display 202** (e.g., a touch screen), other types of physical and/or virtual input devices may be used. Virtual input devices may include software-implemented input devices shown on a display screen (e.g., touchscreen), such as virtual knobs or dials. The qualitative characteristics may be presented on the display using verbiage, graphics (e.g., to graphically illustrate the qualitative characteristics of the welding arc, welding bead, robotic characteristics, etc.), and/or any other method.

The example memory 124 and/or storage device(s) 123 of FIG. 1 store relationships between combinations of the qualitative characteristics represented by the inputs **204*a*-204*d*. The relationships may define ranges of values of combinations of the inputs 204a-204**d such that the welding parameters calculated from the qualitative characteristics are held to an optimum set or range of welding parameters, a preferred range of welding parameters, or a weldable range of welding parameters (e.g., avoiding unweldable conditions).

In response to a change in one of the inputs 204a-204d, the control circuitry 112 determines a corresponding change in one or more of the other inputs 204a-204d based on the relationships between the changed input 210a-210d and the other ones of the inputs 204a-204d. For example, as illustrated in FIG. 2A, in response to the user moving the slider for the arc heat input 204a toward the softer end of the range (e.g., adjusted input 210a), the control circuitry 112 may determine that both the arc length input 204b and the arc stiffness input 204d are to be adjusted (e.g., adjusted inputs 210b, 210d) based on a stored relationship (e.g., to maintain the resulting welding parameters in an optimal, preferred, or weldable range).

In response to a change in one of the inputs (e.g., the input 204a), the control circuitry 112 may determine a corresponding change in a second one based on the change to the input 204a and based on values of others of the inputs (e.g., the inputs 204c and/or 204d). Additionally or alternatively, in response to the change in one of the inputs (e.g., the input 204a), the control circuitry 112 may determine corresponding changes to multiple ones of the inputs 204b-204d.

Figure 2B:
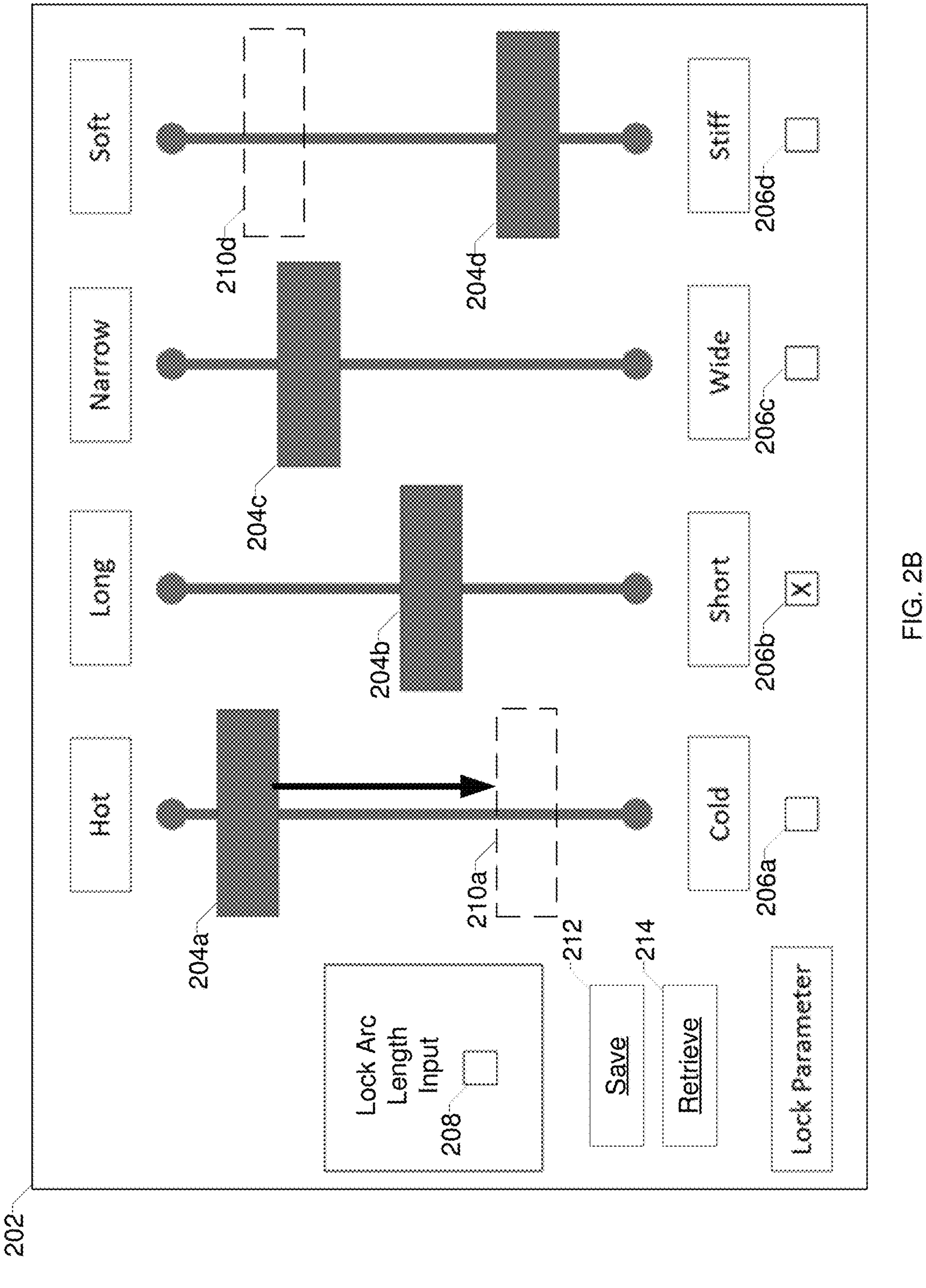
FIG. 2B illustrates the example user interface of FIG. 2A in which one of the inputs is locked against changes caused by changing other qualitative inputs on the interface.

The parameter locking selectors 206a-206d correspond to respective ones of the inputs 204a-204d. When a parameter locking selector 206a-206d is activated (e.g., enabled, locked, etc.), the control circuitry 112 does not adjust the corresponding qualitative characteristic in response to changes to other ones of the inputs 204a-204d. FIG. 2B illustrates the example user interface 200 of FIG. 2A in which one of the inputs (e.g., arc length input 204b) is locked via the parameter locking selector 206b against changes caused by changing other qualitative inputs 204a, 204c, 204d on the interface 200. As shown in FIG. 2B, a change in the arc heat input 204a (which caused a change in the arc length input 204b in the example of FIG. 2A) is not permitted to result in a change in the arc length input 204b. The example control circuitry 112 may compensate for locked input(s) by further adjusting other inputs to remain close to the optimal, preferred, and/or workable range of welding-type parameters. Additionally or alternatively, the control circuitry 112 may determine changes to the other inputs 204a-204d based on output limitations on the power supply 102 (e.g., upper limits on output current, limits on output voltage, etc.).

Additionally or alternatively, the parameter locking selectors 206a-206d may cause the control circuitry 112a to not make changes to other inputs 204a-204d in response to changes in an input 204a-204d for which the corresponding parameter locking selectors 206a-206d is activated or selected. For example, if the parameter locking selector 206a is active, the control circuitry 112 does not determine changes to any of the other inputs 204b-204d when the input 204a corresponding to the parameter locking selector 206a is changed by the operator.

Figure 2C:
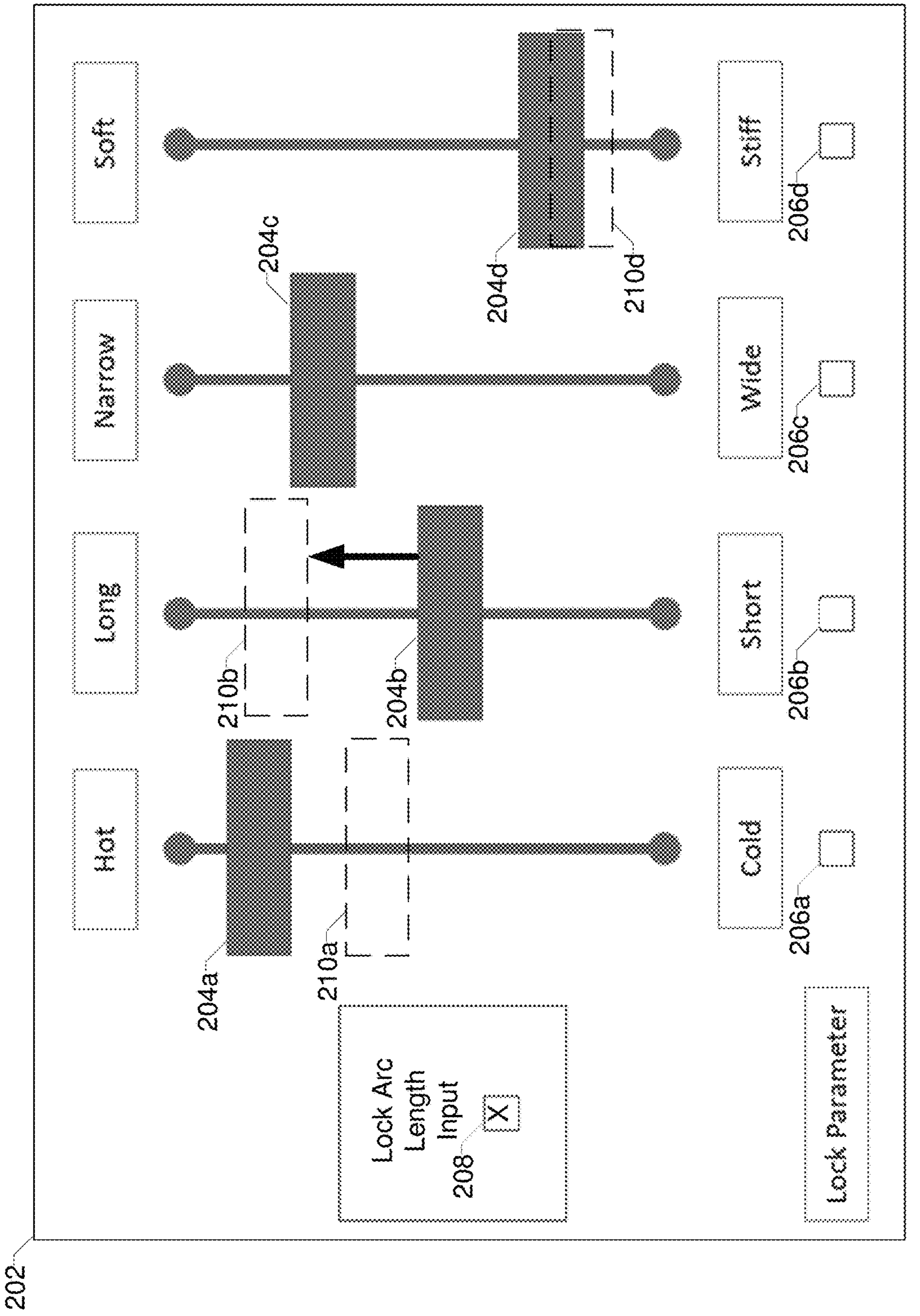
FIG. 2C illustrates the example user interface of FIG. 2A in which a heat input is locked against changes in response to changes to qualitative inputs on the interface.

In some examples, non-adjustable parameters (e.g., parameters not represented by the inputs 204a-204d), such as heat input to the weld, may be locked via the interface 200. FIG. 2C illustrates the example user interface 200 of FIG. 2A in which a heat input is locked (e.g., via the arc length input lock selector 208) against changes in response to changes to qualitative characteristic inputs 204a-204d on the interface 200. While the example interface 200 includes the arc length input lock selector 208, in other examples any qualitative arc characteristic and/or welding parameter may be locked.

When the example arc length input lock selector 208 is activated (or locked), the example control circuitry 112 may adjust the relationship(s) used to change the inputs 204a-204d in response to other input(s). For example, while the arc length input lock selector 208 is activated in the example of FIG. 2C, the response to a change in the arc length input 204b may be based on a different relationship (or the same relationship with different criteria) than when the arc length input lock selector 208 is deactivated (or deselected).

The example user interface 200 of FIGS. 2A and 2B further includes a "save" button 212, which causes the processor (e.g., the processor(s) 120 of FIG. 1) to store the selected qualitative characteristics and/or corresponding calculated parameters to a storage (e.g., the memory 124 and/or storage device(s) 123) for subsequent recall (e.g., via a "retrieve" button 214). The user interface 200 may store one or more programs or configurations. Upon selection of the "retrieve" button 214, the user interface 200 may retrieve and display a saved configuration of one or more such saved configurations.

Figure 3A:
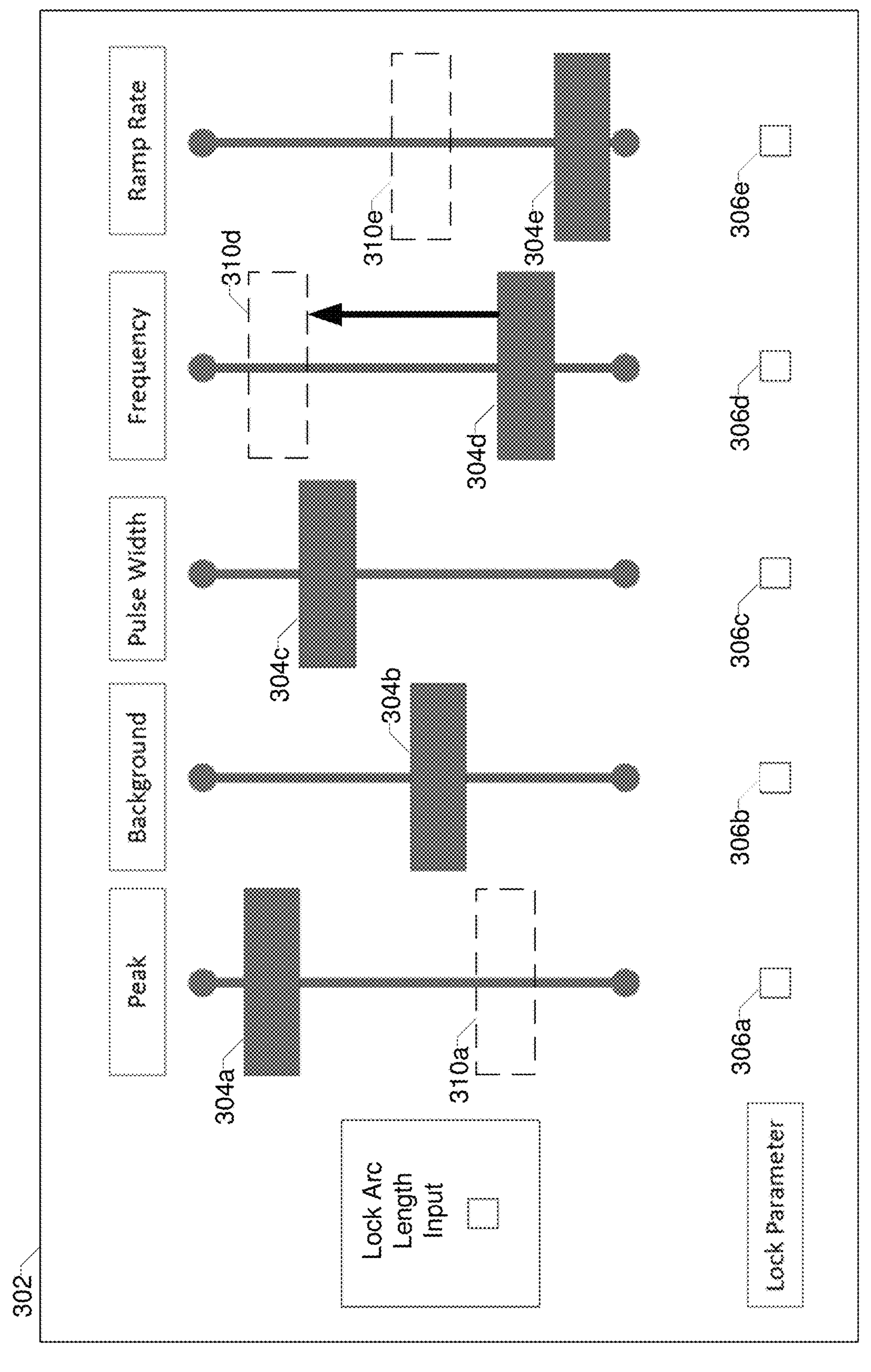
FIG. 3A illustrates an example user interface that may be used to implement the user interface of FIG. 1 to provide an interface for control of the welding-type power supply based on inputting arc pulsing qualities.

FIG. 3A illustrates an example user interface 300 that may be used to implement the user interface 114, 134 of FIG. 1 to provide an interface for control of the welding-type power supply 102 based on inputting arc pulsing qualities. The example user interface 200 of FIG. 2A includes a display 302, input sliders 304a-304e, parameter locking selectors 306a-306e, and an arc length input lock selector 308. The example input sliders 304a-304e, parameter locking selectors 306a-306e, and arc length input lock selector 308 may implement the input devices 115, 135 of FIG. 1.

In contrast with the example qualitative characteristics of FIGS. 2A-2C, the example input sliders 304a-304e provide inputs for qualitative pulse characteristics or parameters. The example input sliders 304a-304e include inputs for the pulse peak 304a (e.g., peak current, peak voltage, peak power), pulse background 304b (e.g., background current, background voltage, background power), a pulse width 304c (e.g., a duration of the peak phase, which may be relative to the background phase), a frequency 304d (e.g., a number of pulses per second), and a ramp rate 304e (e.g., a transition time between the peak and background phases).

While there are multiple forms of pulse waveforms which may use different qualitative pulse characteristics in the interface 300, many pulse waveforms are defined by at least a peak phase, a background phase, and a frequency.

As in the example interface 200, when an operator changes the value of one of the inputs 304a-304e, the control circuitry 112 determines changes to one or more other inputs 304a-304e based on one or more relationship(s) between the inputs 304a-304e. The relationships may define ranges of values of combinations of the inputs 304a-304e that the welding parameters calculated from the qualitative characteristics are held to an optimum set or range of welding parameters, a preferred range of welding parameters, or a weldable range of welding parameters (e.g., avoiding unweldable conditions). In the example of FIG. 3A, as the operator increases the frequency input 304d to an adjusted input 310d, the control circuitry 112 determines that the peak input 304a is to be decreased to an adjusted input 310a and the ramp rate 304e is to be increased to an adjusted input 310e.

Figure 3B:
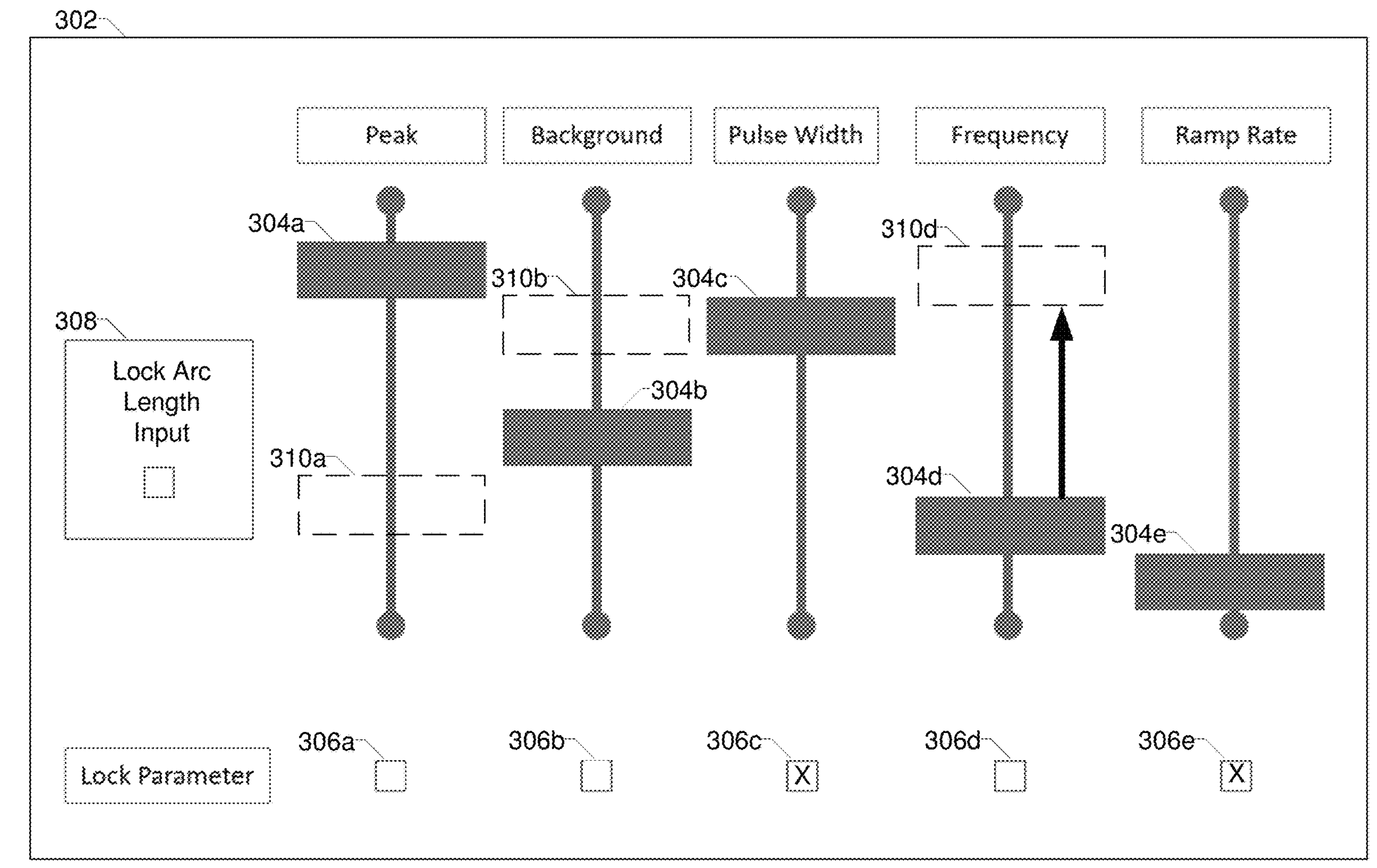
FIG. 3B illustrates the example user interface of FIG. 3A in which one of the inputs is locked against changes caused by changing other qualitative inputs on the interface.

In a similar manner as described above with reference to FIG. 2B, the parameter locking selectors 306a-306e limit changes to the inputs 304a-304e by the control circuitry 112 caused by changes to other ones of the inputs 304a-304e and the stored relationship(s) between the inputs 304a-304e. FIG. 3B illustrates the example user interface 300 of FIG. 3A in which the inputs 304c, 304e are locked by the parameter locking inputs 306c, 306e against changes caused by a change in another qualitative input (e.g., the frequency input 304d) on the interface 300. In the example of FIG. 3B, the control circuitry 112 determines that a decrease in the peak input 304a, an increase in the background input 304b, and an increase in the ramp rate input 304e will keep the resulting welding parameters within the optimal, preferred, or workable range, and/or due to output limitations on the power supply 102.

Figure 4:
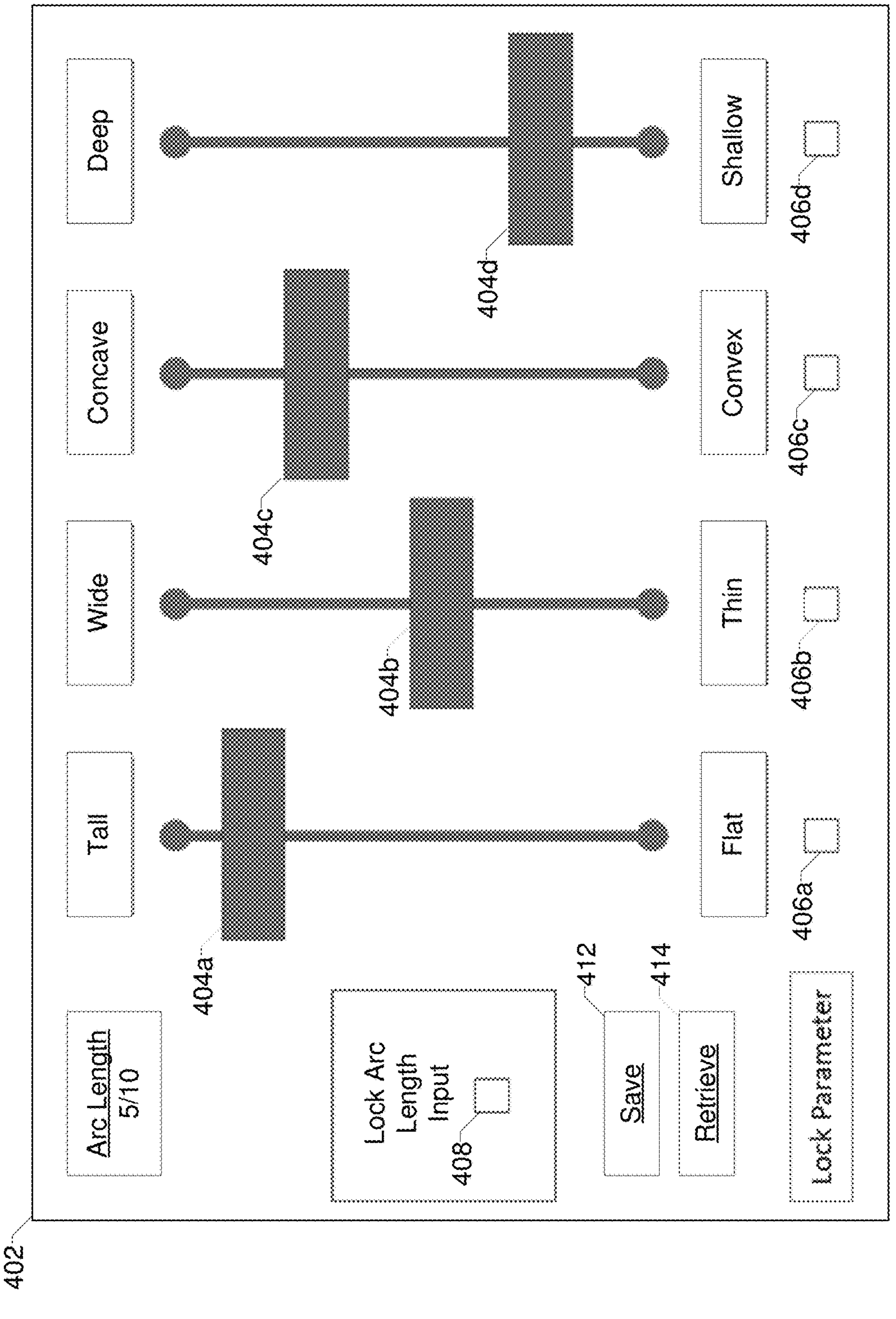
FIG. 4 illustrates an example user interface that may be used to implement the user interface of FIG. 1 to provide an interface for control of the welding-type power supply based on inputting qualitative characteristics of a welding bead.

Additionally or alternatively, the user interface may receive inputs associated with qualitative characteristics of a welding bead, either alone or in combination with characteristics of the welding arc, pulse characteristics, and/or robotic control characteristics. FIG. 4 illustrates an example user interface 400 that may be used to implement the user interface 114, 134 of FIG. 1 to provide an interface for control of the welding-type power supply 102 based on inputting qualitative characteristics of a welding bead. The example user interface 400 is similar to the example user interface 200 of FIG. 2A, and includes weld bead qualitative characteristic inputs 404a-404d, parameter locking selectors 406a-406d, an arc length input lock selector 408, a save button 412, and a retrieve button 414. The example weld bead qualitative characteristic inputs 404a-404d include bead height 404a, bead width 404b, bead concavity 404c, and penetration 404d.

In addition, or as an alternative, to the welding arc characteristics, welding bead characteristics, and/or pulse characteristics, in some examples the user interface may include inputs for qualitative characteristics of robotic welding, such as travel speed, work angle, travel angle, and/or any other robotic welding characteristics.

Figure 5:
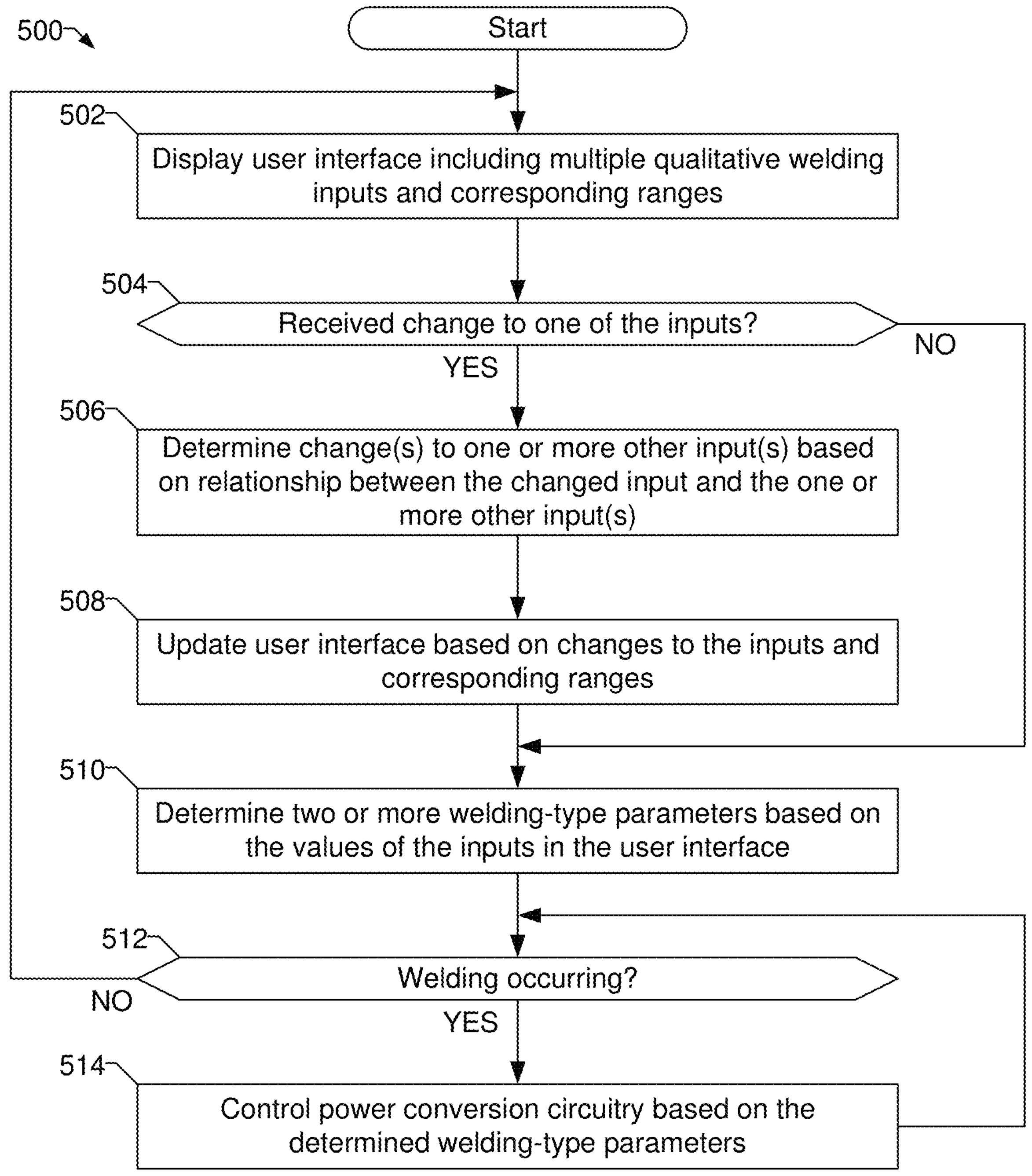
FIG. 5 is a flowchart illustrating example machine readable instructions which may be executed by the welding-type power supply of FIG. 1 to control of the welding-type power supply based on inputting qualitative characteristics of a welding arc.

FIG. 5 is a flowchart illustrating example machine readable instructions 500 which may be executed by the welding-type power supply 102 of FIG. 1 to control the welding-type power supply 102 based on inputting qualitative characteristics of a welding arc. The example instructions 500 may be stored in the storage device 123 and/or the memory 124, and executed by the processor(s) 120. The instructions 500 are discussed below with reference to the power supply 102 and the user interface 200 of FIGS. 2A-2C. However, blocks 502-16 may be performed by the example remote interface 104 of FIG. 1.

At block 502, the control circuitry 112 displays a user interface (e.g., the user interface 200 of FIG. 2A) including multiple qualitative characteristic inputs 204a-204d and corresponding ranges. In the example of FIG. 2A, the ranges of the welding inputs 204a-204d are normalized to slider bars having the same lengths. However, in other examples, the inputs 204a-204d may have different slider bar lengths, or different types of physical or virtual input devices, to correspond to the ranges of the inputs 204a-204d.

At block 504, the control circuitry 112 determines whether a change to one of the inputs 204a-204d has been received. For example, an operator may manipulate one of the slider bars on the inputs 204a-204d to change the corresponding qualitative characteristic. If a change to one of the inputs 204a-204d has been received (block 504), at block 506 the control circuitry 112 determines change(s) to one or more other ones of the inputs(s) 204a-204d based on a relationship between the changed input 210a-210d and the one or more other input(s) 204a-204d. For example, the control circuitry 112 may determine which input(s) 204a-204d should be changed, and the degree of change, based on comparing resulting welding parameters to an optimal, preferred, or workable range of welding parameters corresponding to the changed input(s) 210a-210d and/or any locked input(s) 204a-204d. For example, the control circuitry 112 may select different relationships depending on which input 204a-204d is changed, which input(s) 204a-204d are locked (if any), and/or if the arc length input lock selector 208 is activated or selected.

At block 508, the control circuitry 112 updates the user interface 200 based on changes to the inputs 204a-204d and the corresponding ranges of the inputs 204a-204d. In some examples, the control circuitry 112 updates the interface 200 with the changes to the inputs 204a-204d in real-time as the user changes the input (e.g., moves the slider), so that the user can observe the changes made to other arc characteristics as the selected qualitative characteristic is changed.

After updating the user interface (block 508), or if a change to the inputs has not been received (block 504), at block 510 the control circuitry determines two or more welding-type parameters based on the values of the qualitative characteristic inputs 204a-204d to the user interface 200. The welding-type parameters may include, for example, voltage, current, wire feed speed, wire preheating voltage, wire preheating current, power, heat input, inductance, arc control, and/or pulse parameters. In some examples, the range of values of individual qualitative characteristics and/or combinations of qualitative characteristics are mapped to corresponding ranges of the welding-type parameters, such that the control circuitry 112 may determine the welding-type parameters by translating the values of the inputs 204a-204d to the welding-type parameters based on the respective mappings.

At block 512, the control circuitry 112 determines whether welding is occurring via the power supply 102. For example, the control circuitry 112 may monitor output voltage and/or currents from the power conversion circuitry 110, monitor a trigger signal from the welding torch 106, and/or any other method of determining whether welding is occurring. If welding is not occurring (block 512), control returns to block 502 to permit the user to continue adjusting the inputs 204a-204d.

While welding is occurring (block 512), at block 514 the control circuitry 112 controls the power conversion circuitry 110 based on the determined welding-type parameters. Control then returns to block 512 to continue welding until the welding has ended.

The present methods and systems may be realized in hardware, software, and/or a combination of hardware and software A typical combination of hardware and software may include one or more application specific integrated circuits and/or chips. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term “non-transitory machine-readable medium” is defined to include all types of machine readable storage media and to exclude propagating signals.

As utilized herein the terms “circuits” and “circuitry” refer to physical electronic components (i.e. hardware) and any software and/or firmware (“code”) which may configure the hardware, be executed by the hardware, and or otherwise be associated with the hardware. As used herein, for example, a particular processor and memory may comprise a first “circuit” when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:

power conversion circuitry configured to convert input power to welding-type power;

a user interface configured to receive two or more inputs associated with corresponding qualitative characteristics of a welding arc created by the welding-type power, wherein the two or more inputs are defined within corresponding ranges of the respective qualitative characteristics; and control circuitry configured to:

in response to a change in a first one of the two or more inputs, determine a corresponding change in a second one of the two or more inputs based on a relationship between the first and second ones of the two or more inputs;

determine two or more welding-type parameters based on the two or more inputs; and control the power conversion circuitry based on the determined welding-type parameters, wherein the user interface further includes a locking input for the second one of the two or more inputs, wherein the control circuitry is configured to not implement the change in the second one of the two or more inputs when the locking input is enabled.

2. The welding-type power supply as defined in claim 1, wherein the control circuitry is configured to update the user interface to represent the changes to the second one of the one or more inputs based on the change made to the first one of the one or more inputs.

3. The welding-type power supply as defined in claim 1, wherein the user interface further includes an arc length locking input, wherein the control circuitry is configured to determine changes in the second one of the two or more inputs in response to a change in the first one of the two or more inputs based on maintaining an arc length when the arc length locking input is enabled.

4. The welding-type power supply as defined in claim 3, wherein the control circuitry is configured to determine the changes in the second one of the two or more inputs based on maintaining a heat input while the arc length locking input is enabled, wherein the heat input is based on a configuration of the two or more inputs when the arc length locking input is enabled.

5. The welding-type power supply as defined in claim 3, wherein the control circuitry is configured to display a value of the arc length via the user interface.

6. The welding-type power supply as defined in claim 1, wherein the two or more welding-type parameters comprise two or more pulse parameters.

7. The welding-type power supply as defined in claim 1, wherein the control circuitry is configured to determine the change in the second one of the two or more inputs based on a lookup table representative of at least one of the relationship or sets of parameter values for the qualitative characteristics.

8. The welding-type power supply as defined in claim 1, wherein the two or more inputs comprise two or more arc pulsing qualities.

9. The welding-type power supply as defined in claim 8, wherein the two or more arc pulsing qualities comprise two or more of: a pulse peak, a pulse background, a pulse width, a pulse frequency, or a pulse ramp rate.

10. The welding-type power supply as defined in claim 1, wherein the user interface comprises a touchscreen configured to show the two or more inputs.

11. The welding-type power supply as defined in claim 10, wherein the two or more inputs each include an interactive slider input, in which the touchscreen is configured to enable manipulation of each slider input within a corresponding range of the slider input.

12. The welding-type power supply as defined in claim 1, wherein the two or more inputs comprise two or more of: an arc heat input; an arc penetration; an arc length; an arc width; or an arc stiffness.

13. The welding-type power supply as defined in claim 1, wherein the user interface includes three or more inputs associated with corresponding qualitative characteristics of the welding arc, the control circuitry configured to, in response to the change in the first one of the three or more inputs, determine a corresponding change in the second one of the three or more inputs based on the first one of the three or more inputs and a third one of the three or more inputs.

14. The welding-type power supply as defined in claim 1, wherein the user interface includes three or more inputs associated with corresponding qualitative characteristics of the welding arc, the control circuitry configured to, in response to the change in the first one of the three or more inputs, determine corresponding changes in the second one of the three or more inputs and in a third one of the three or more inputs, based on the change in the first one of the three or more inputs.

15. A welding-type power supply, comprising:

power conversion circuitry configured to convert input power to welding-type power;

a user interface configured to receive two or more inputs associated with corresponding qualitative characteristics of a welding bead created by the welding-type power, wherein the two or more inputs are defined within corresponding ranges of the respective qualitative characteristics; and control circuitry configured to:

in response to a change in a first one of the two or more inputs, determine a corresponding change in a second one of the two or more inputs based on a relationship between the first and second ones of the two or more inputs;

determine two or more welding-type parameters based on the two or more inputs; and control the power conversion circuitry based on the determined welding-type parameters, wherein the user interface further includes a locking input for the second one of the two or more inputs, wherein the control circuitry is configured to not implement the change in the second one of the two or more inputs when the locking input is enabled.

16. The welding-type power supply as defined in claim 1, wherein the user interface further comprises an input associated with a qualitative characteristics of a welding arc.

17. The welding-type power supply as defined in claim 1, wherein the user interface further comprises an input associated with a qualitative characteristics of robotic welding.

18. The welding-type power supply as defined in claim 15, wherein the qualitative characteristics of a welding bead comprise at least one of a weld bead width, a weld bead height, a weld bead concavity, or a penetration.

19. A welding interface, comprising:

a user interface configured to receive two or more inputs associated with corresponding qualitative characteristics of a welding arc, a welding bead, or a combination of the welding arc and the welding bead, wherein the two or more inputs are defined within corresponding ranges of the respective qualitative characteristics; and control circuitry configured to:

in response to a change in a first one of the two or more inputs, determine a corresponding change in a second one of the two or more inputs based on a relationship between the first and second ones of the two or more inputs; and determine two or more welding-type parameters based on the two or more inputs, wherein the user interface further includes a locking input for the second one of the two or more inputs, wherein the control circuitry is configured to not implement the change in the second one of the two or more inputs when the locking input is enabled.

20. The welding-type power supply as defined in claim 1, wherein the user interface is configured to:

receive three or more inputs, comprising the first one of the two or more inputs, the second one of the two or more inputs, and a third input corresponding to a third qualitative characteristic of the welding arc, wherein the user interface further includes a first selectable locking input for the second one of the two or more inputs, wherein the control circuitry is configured to:

while the first locking input is not selected, in response to a change in the first one of the two or more inputs, determine a corresponding change in the second one of the two or more inputs and a corresponding change in the third input based on a first relationship between the third input and the first and second ones of the two or more inputs; and while the first locking input is selected, in response to a change in the first one of the two or more inputs, lock the second one of the two or more inputs against changes and determine a corresponding change in the third input based on a second relationship between the third input and the first and second ones of the two or more inputs.

* * * * *